(12) United States Patent
Takumori et al.

(10) Patent No.: US 7,004,552 B2
(45) Date of Patent: Feb. 28, 2006

(54) BRAKE HYDRAULIC CONTROL ACTUATOR FOR VEHICLES

(75) Inventors: Hiroshi Takumori, Asahi-shi (JP); Makoto Hyodo, Asahi-shi (JP)

(73) Assignee: Continental Teves AG & Co., Frankfurt (DE)

( * ) Notice: Subject to any disclaimer, the term of this patent is extended or adjusted under 35 U.S.C. 154(b) by 0 days.

(21) Appl. No.: 10/847,178

(22) Filed: May 17, 2004

(65) Prior Publication Data

US 2004/0244371 A1 Dec. 9, 2004

(30) Foreign Application Priority Data

May 15, 2003 (JP) .............................. 2003-137751

(51) Int. Cl.
*F16F 15/08* (2006.01)
(52) U.S. Cl. .................................................. 303/116.4
(58) Field of Classification Search ............. 303/116.4, 303/116.3, DIG. 10, DIG. 11, 113.1, 116.2; 137/884; 138/30, 31; 248/635, 638
See application file for complete search history.

(56) References Cited

U.S. PATENT DOCUMENTS

| 5,244,262 A | * | 9/1993 | Kehl et al. ................ 303/119.3 |
| 5,464,187 A | * | 11/1995 | Linkner, Jr. ................. 248/635 |
| 6,099,190 A | * | 8/2000 | Honobe et al. ............... 403/13 |
| 6,142,751 A | * | 11/2000 | Krauter et al. .............. 417/415 |

FOREIGN PATENT DOCUMENTS

| JP | 2000-356247 | * | 12/2000 |
| JP | 2001-108017 | * | 4/2001 |
| JP | P-2002-362344 A | | 12/2002 |

* cited by examiner

*Primary Examiner*—Chris Schwartz
(74) *Attorney, Agent, or Firm*—Apex Juris, pllc; Tracy M Heims

(57) ABSTRACT

This brake hydraulic control actuator increases ability to reserve the leaked brake fluid and degree of freedom for the structural layout in the actuator body. The bottom surface of the actuator body (10) having the cylinder bores (43) of the low pressure reservoirs (40) and (41) thereon is closed and sealed by the pot plate (20), and the pocket (23), which projects toward the direction to depart from the bottom surface, is formed in the pot plate (20).

3 Claims, 6 Drawing Sheets

BRAKE HYDRAULIC CONTROL ACTUATOR FOR VEHICLES

BACKGROUND OF THE INVENTION

1. Field of Invention

This invention relates to a brake hydraulic control actuator for vehicles.

2. Description of Related Arts

A conventional brake hydraulic control actuator for vehicles is installed in hydraulic channels/circuits between brake master cylinders 70 and wheel brakes 80. It comprises solenoid valves 16' controlling a brake fluid that flows in and/or out from the wheel brakes 80, 2 piston-type low pressure reservoirs reserving the brake fluid flown from the wheel brake 80 through the solenoid valves 16', two pumps 14', 15' returning the brake fluid within the low pressure reservoirs to the hydraulic channels/circuits, and a motor driving the pumps 14', 15', and an actuator body on which all of the above-described elements are mounted.

The low pressure reservoir comprises a piston which partitions a cylinder bore into a hydraulic chamber and a gas chamber, and a compression coil urging the piston from the gas chamber side to the hydraulic chamber side.

If the gas chamber is exposed to atmosphere, foreign material such as moisture and dust fall into the gas chamber, thereby giving an adverse effect on the brake system.

In order to prevent the foreign material from entering into the gas chamber, some conventional methods introduce a technology where an opening of the gas chamber is closed by a lid that has vents, thereby allowing the gas chamber to communicate with the atmosphere. This technology, however, does not completely prevent foreign material from entering into the gas chamber because water may enter through the vents provided on the lid.

Japanese Provisional Patent Publication No. 2002-362344 (JP202-362344), FIG. 6 shows a typical, conventional hydraulic circuit which is also applicable to the present invention. FIGS. 3 and 4 shows an improved technology that is designed to prevent material from entering into the gas chamber. It provides a reservoir sealing structure where the opening of the cylinder bore is completely sealed by a protection cap.

In order to install the brake hydraulic control actuator on a vehicle body, as shown in FIG. 5, plural rubber mount 61 having shock absorbing effects are pre-mounted on lower right and left surfaces of the actuator body 60 and are installed in stays 63 of the vehicle side.

The above-described conventional brake hydraulic control actuator has the following points to be improved.

<A> The conventional technology of the foreign material preventive measure in JP2002-362344 is very effective in preventing the foreign material from entering because of the sealing structure of the reservoir. However, because of the air spring operation of the spring chamber due to the piston slide, the operational pressure of the reservoir increases more than necessary, thereby damaging the pressure reduction function during the control of the anti-lock brake system. Lower operational pressure of the reservoir is preferable so far as controlling of the anti-lock brake system.

<B> The protection cap sealing the opening of the cylinder bore elastically deforms the body outside of the cylinder bore and is fixed by crimping of the same. In order to complete crimping, the bottom portion of the actuator body needs to be designed sufficiently wider and thicker for crimping, which is not economical.

<C> Generally, to avoid the leakage of the brake fluid from the sliding/stroking portion of the pump to inside of the motor, fluid outlet holes for the brake fluid leakage are vertically formed in the actuator body, so that the leakage is discharged from an intermediate position between two accumulators installed at the lower portions of the actuator body. The brake fluid leakage cannot be disposed as it is. Therefore, the brake fluid leakage is reserved in a tube-like drain pan provided at the lower portion of the fluid outlet holes. However, a gap between two accumulators is often too narrow to secure sufficient space (volume) for reserving the brake fluid leakage in the drain pan.

<D> As shown in FIG. 5, the rubber mount 61 comprises many parts such as an installation bolt 63 directly fixed into the actuator body 60, a cylindrical outer sleeve 64 integrated with the installation bolt 63, a doughnut vibration isolation rubber 65 housed in the outer sleeve 64, a connection bolt 66 positioned in a central region of the vibration isolation rubber 65.

<E> The actuator body 60 requires to be small. It also requires simple structural layout for many functional components and channel/circuit formed in the actuator 60. However, the conventional technology for mounting the components in the actuator body 60 requires the installation bolt 63 of the rubber mount 61 to be installed directly in the actuator body 60, thereby restricting free and desirable layouts for the functional components and channel/circuit mounted within the actuator body 60.

SUMMARY OF THE INVENTION

An object of this invention is to provide the brake hydraulic control actuator for vehicles which prevents entry of the foreign material and sufficiently reserves the brake fluid leakage.

Another object of this invention is to provide the brake hydraulic control actuator for vehicles which does not become an obstacle for the layout within the actuator body and sufficiently functions with smaller number of members.

In order to achieve the objectives, this invention provides a brake hydraulic control actuator for a vehicle comprising: an actuator body which has a solenoid valve 16' installed in a hydraulic channel between a brake master cylinder 70 and a wheel brake 80 so as to control brake fluid flowing in and out the wheel brake 80, low pressure reservoirs which reserve the brake fluid flown from the wheel brake 80 through the solenoid valve 16', a pump which returns the brake fluid within the pressure reservoirs to the hydraulic channel, and a motor which drives the pump; a brake fluid leakage outlet hole formed between an pump interior and a bottom surface of an actuator body; a pot plate which closes the bottom surface of the actuator body having cylinder bores for the low pressure reservoirs; and a pocket formed on the pot plate projecting toward a direction to be apart from the bottom surface of the actuator body.

This invention also provides the brake hydraulic control actuator for a vehicle as above, wherein: the pot plate has plural brackets therearound, and the brackets have rubber mounts.

This invention also provides the brake hydraulic control actuator for a vehicle as above, wherein: the rubber mount comprises a doughnut rubber and an inner bolt installed in a central region of a vibration isolation rubber.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF THE PREFERRED EMBODIMENTS

Embodiment 1

A brake hydraulic control actuator of this invention will be explained with reference to the attached figures.

<A> Summary of Brake Hydraulic Control Actuator

Figure 1:
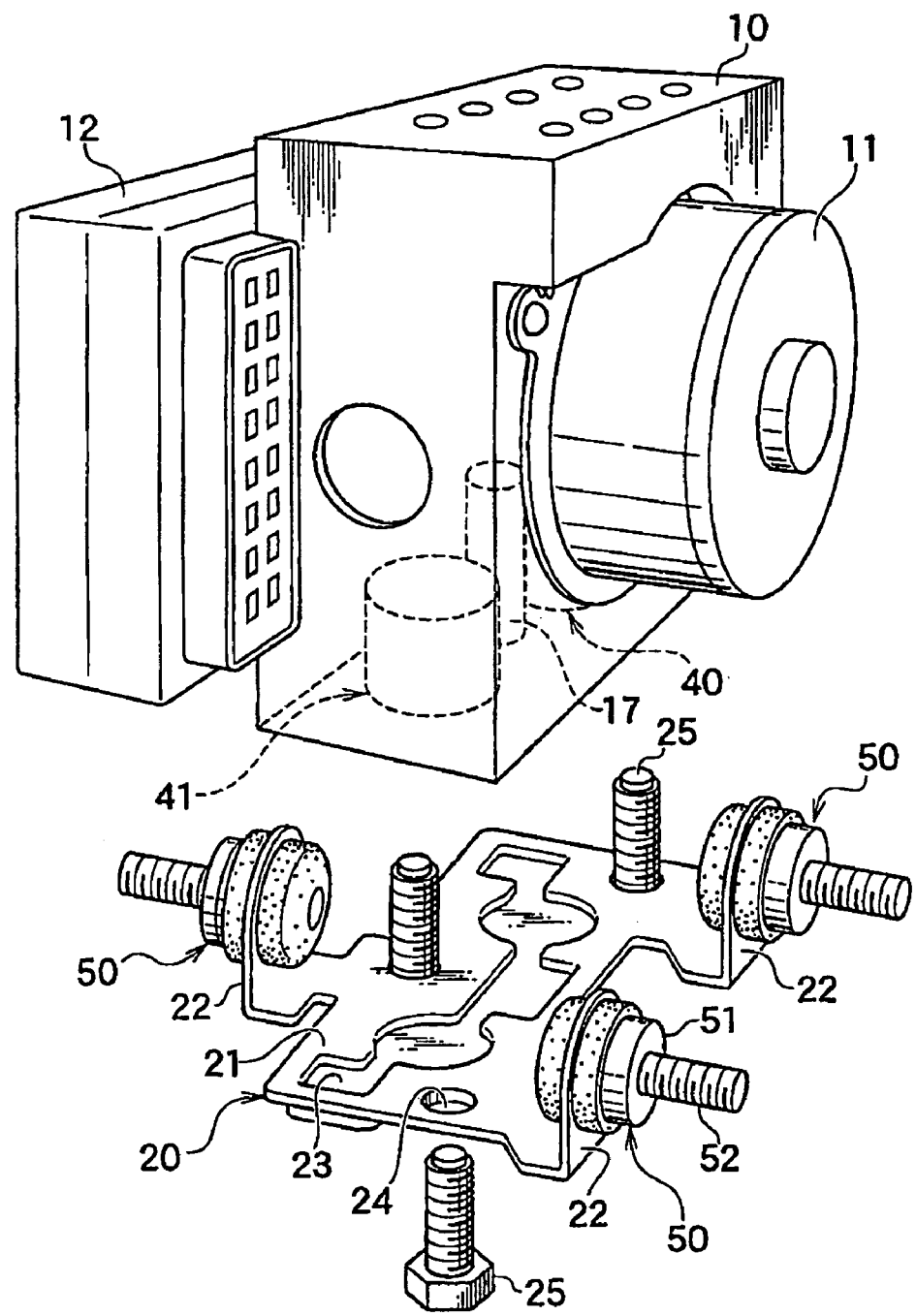
FIG. 1 is a general view of the brake hydraulic control actuator for vehicles as described in Embodiment 1 of this invention.
Figure 2:
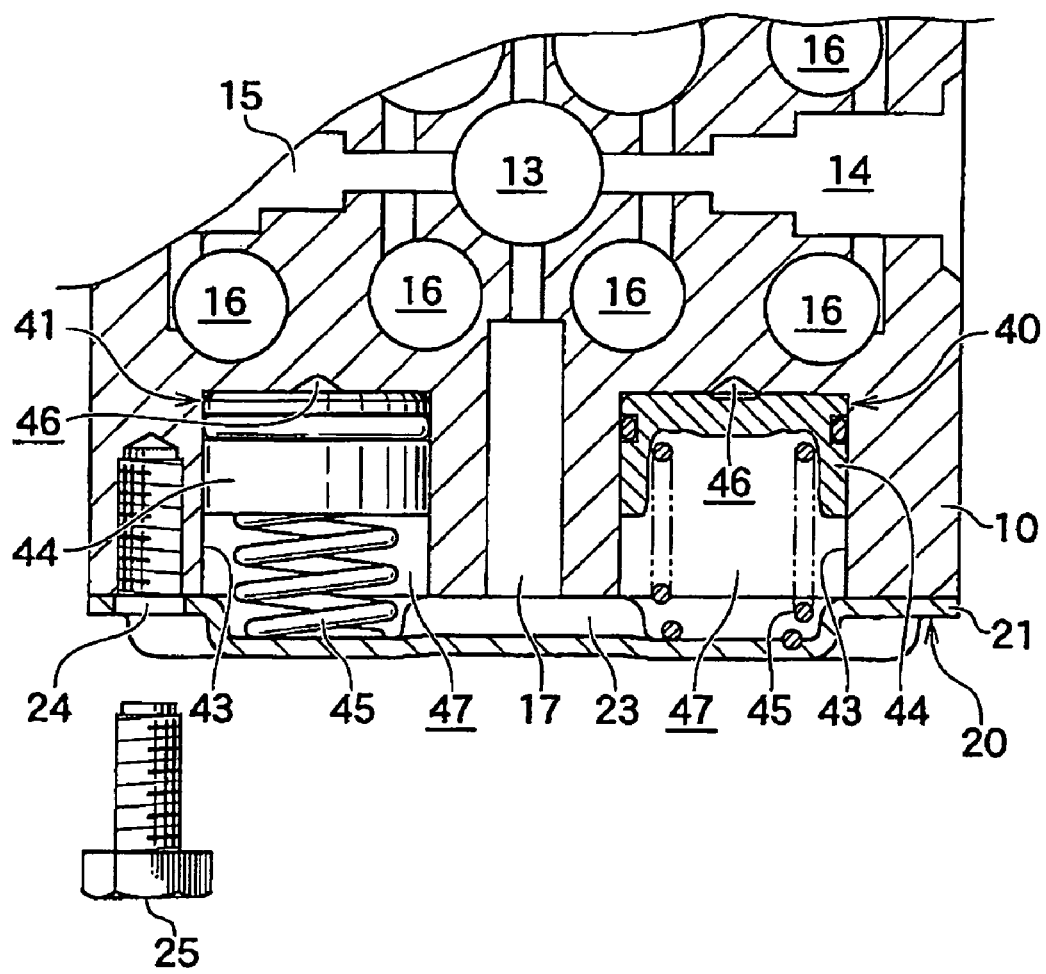
FIG. 2 is a cross-section view of the lower half section of the actuator body.
Figure 3:
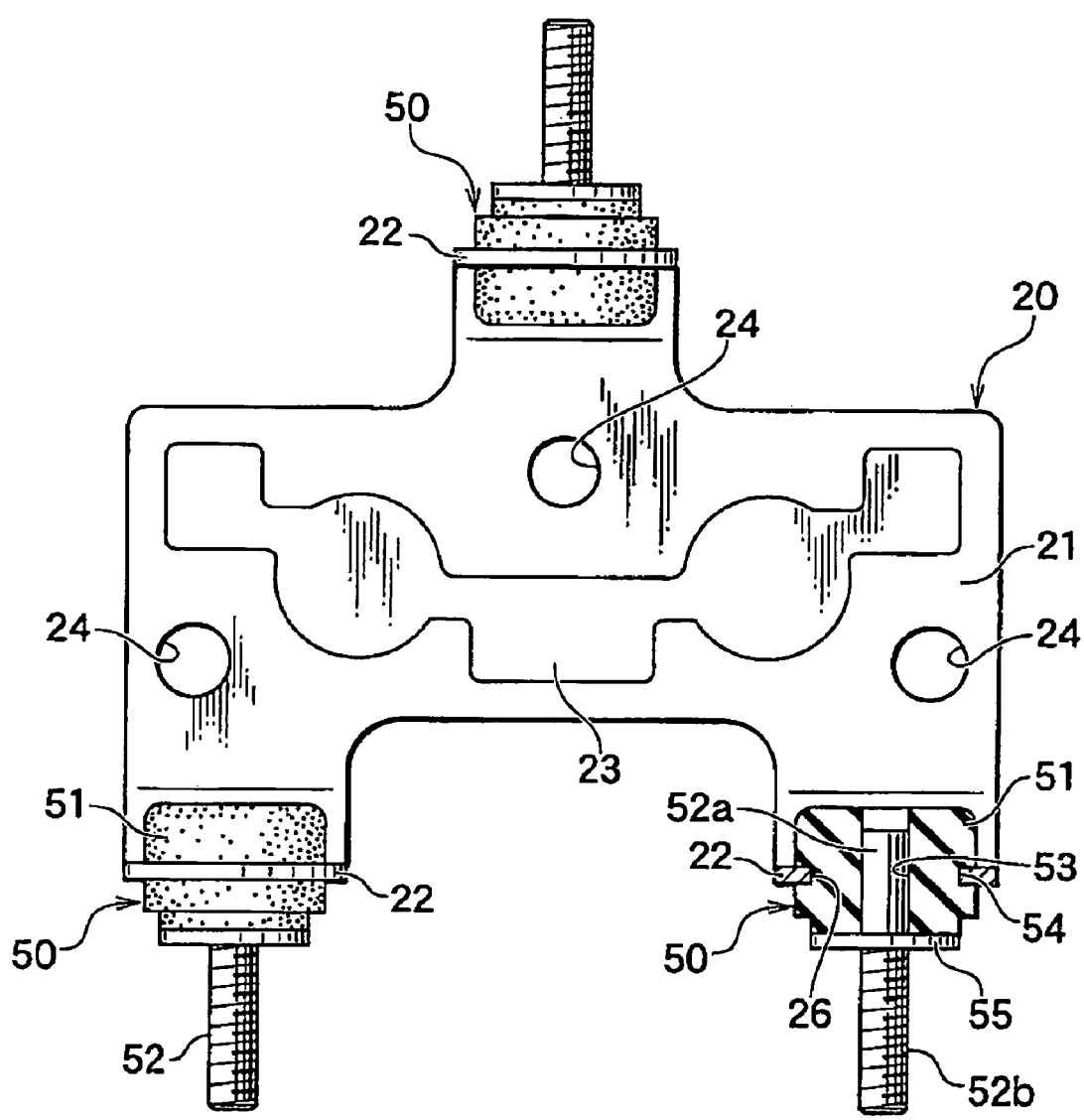
FIG. 3 is a plan view of the pot plate.

FIG. 1 is a general view of the brake hydraulic control actuator for vehicles installed in a hydraulic channel/circuit between a brake master cylinder for vehicles and a wheel brake. FIG. 2 is a cross-section view of a lower half of an actuator body 10 and FIG. 3 is a plan view of a pot plate 20.

As shown in FIG. 1, the brake hydraulic control actuator comprises the actuator body 10, a motor 11 driving a pump mounted on a right side of the body 10, a cover 12 having the electronic control unit therein mounted on a left side of the body 10, and a pot plate 20 fixed on a bottom surface of the body 10 with a bolt 25.

This invention adds the multifunctional pot plate 20, which at least has a function as a lid of the low pressure reservoirs 40 and 41, a function as an oil pan reserving leaked brake fluid, and a function as a member allowing the body 10, while canceling the vibration of the vehicle body, to be mounted on the vehicle.

FIG. 1 shows an integral type of the brake hydraulic control actuator where the electronic control unit is integrated with the body 10. Alternatively, it may be a separate type where the electronic control unit is separated from the body 10, and a cable is used to electrically connect therebetween. In such a case, a cover 12 is not a necessary component of this invention.

Material components of the brake hydraulic control actuator of this invention will be explained below.

<B> Actuator Body

As shown in FIG. 2, the body 10 is a box-shape and for example is made of aluminum alloy.

The body 10 has a plunger pump cam chamber 13 having an eccentric cam which is rotated by the motor, pump chambers 14 and 15, having the plunger pumps therein, positioned at both right and left sides of the plunger pump cam chamber 13 in an orthogonal direction relative to the driving shaft of the motor, plural valve chambers 16 positioned and lined upper and/or lower sides of two pump chambers 14 and 15 with a predetermined interval, a leaked brake fluid outlet hole 17 formed in the bottom surface between the plunger pump cam 13 and the body 10, and two low pressure reservoirs 40 and 41.

The leaked brake fluid outlet hole 17 is formed preferably in a vertical direction, and an opening of the bottom surface of the body 10 is positioned between two low pressure reservoirs 40 and 41.

It is not described in the figures but possible to include additional/alternative members such as a check valve which inhibits the brake fluid to flow from the master cylinder 70 side to the wheel brake side, an orifice, a damper chamber, and a solenoid valve 16' for switching the control system. It is also possible to establish an additional/alternative channel (not shown in the figures) which connects these additional/ alternative members. In other words, any additional/alternative members or channels (not shown in the figures) may be added according to the type of brake control system as necessary.

<C> Low Pressure Reservoir

As shown in FIG. 2, internal structures of the low pressure reservoirs 40 and 41 are identical, and therefore the following section deals with the reservoir 40 only. The same reference numbers used to explain the reservoir 40 are applicable to the reservoir 41 and the explanation thereof is omitted.

The low pressure reservoir 40 has a cylinder bore 43 vertically formed on the bottom surface of the body 10, a piston 44 strokably/slidably housed in the cylinder bore 43, and a compression coil spring 45.

In FIG. 2, the cylinder bore 43 is partitioned to form a hydraulic chamber 46 surrounded by an upper internal surface of the cylinder bore 43 and a top surface of the piston 44 and to form a spring chamber 47 surrounded by a lower internal surface of the cylinder bore 43 and a bottom surface of the piston 44.

The compression coil spring 45 is housed in the spring chamber 47 wherein an upper portion of the compression coils spring 45 is attached to the piston 44 and a lower portion thereof is supported by the pot plate 20, thereby constantly exerting a spring force to the piston 44 so that the hydraulic chamber 46 is compressed. An operational pressure of the reservoir 40 is basically determined by the spring force of the compression coil spring 45. However in the strict sense, it is determined by the spring force and a sliding/stroking resistance of the piston 44.

This invention does not require independent lids in order to close the respective cylinder bores 43 and 43.

The later described pot plate 20 is employed to cover openings of both cylinder bores 43 and 43 exposed on the bottom surface of the body 10. Accordingly, comparing with the traditional technology of utilizing crimping/caulking for fixing the lid, no additional surface or thickness for crimping/caulking is necessary on the bottom surface of the body 10.

<D> Pot Plate

The pot plate 20 of FIG. 2 is a steel plate which comprises a rectangular plate body 21 mounted on the bottom surface of the body 10 with bolts 24, plural brackets 22 formed by extending peripheral portions of the plate body 21 in a strap-like form, and rubber mounts 50 assembled in the respective bent bracket 22

The plate body 21 has a concaved pocket 23 and bolt holes 24 formed at appropriate positions around the pocket 23. The plate body 21 also has the brackets 22 formed by bending extended peripheral portion of the body 21 in the right angle. The number of brackets 22 and an interval between the brackets 22 are not limited to what is described in this embodiment and figures, and can be decided in appropriate ways as necessary.

There is no special restriction regarding the materials and processing methods for the pot plate 20. For example, the plate body 20 can be made by pressing a metal plate, or can be an integral type made of rigid resin.

The pocket 23 is designed to reserve the leaked brake fluid and to function as a member to relax the air spring effect within the sealed spring chamber 47. The pocket 23 is extended around openings of the cylinder bores 43 for the low pressure reservoirs 40 and 41 and the leaked brake fluid outlet hole 17. There is no vent on the pocket 23.

The air spring effect within the sealed spring chamber 47 is relaxed because the pot plate 20 forming the pocket 23 seals the bottom surface of the body 10 so that the space in spring chambers 47 of the low pressure reservoirs 40 and 41 communicate with the space in the pocket 23 as well as the space in the leaked brake fluid outlet hole 17, thereby reducing the pressure resistance of the air within the spring chambers 47.

Accordingly, the amount of reservation of the leaked brake fluid and the efficiency of relaxing the air spring effect of the spring chamber 47 due to the piston slide/stroke increases in proportion to the volume of the pocket 23.

In this embodiment, in order to increase the volume of the pocket 23 without excessively increasing the depth of the pocket 23, the pocket 23 faces both low pressure reservoirs 40 and 41 and exceeds the distance between both low pressure reservoirs 40 and 41. However, the shape of the pocket 23 is not limited to what is described here.

If the depth of the pocket 23 is set equal to or thicker than thickness of the head of the bolt 25, the bolt head would not project downward from the lower surface of the pot plate 20 after the assembly.

Although the bolt 25 only may maintain the sealing effect between the pot plate 20 and the bottom surface of the body 10 to some degrees, in order to obtain higher sealing effect, other publicly known sealing materials or high viscosity sealing medium may be inserted between the plate body 21 around the periphery of the pocket 23 and the bottom surface of the body 10.

As shown in FIG. 3, an installation hole 26 for a rubber mount 50 may be formed in the respective bracket 22 bent in the right angle from the plate body 21.

The rubber mount 50 comprises the doughnut vibration isolation rubber 51 and an inner bolt 52 installed in a central region of the vibration isolation rubber 51.

The vibration isolation rubber 51 has a center hole 53 at the central region thereof and an annular groove 54 on the peripheral surface which fits with the installation hole 26.

The inner bolt 52 has a flange 55 in the middle of the stem, and an upper stem 52a penetrates through the center hole 53 to be integrated with the vibration isolation rubber 51 while a lower stem 52b projecting out and exposing from the vibration isolation rubber 51 has threads.

In order to install the rubber mount 50 in the bracket 22 of the pot plate 20, simply the vibration isolation rubber 51 is elastically deformed to fit the installation hole 26 of the bracket with the annular groove 54. The rubber mount 50 is stably held due to elasticity of the vibration isolation rubber 51 after the installation.

Operation

As for the above-described brake hydraulic control actuator for vehicles, the brake fluid is reserved in the low pressure reservoir 40 and 41, and the pump operates to return the reserved hydraulic pressure toward the master cylinder during the anti-lock brake control or traction brake control. Fundamental operation of the low pressure reservoirs 40 and 41 is same as the conventional art.

When the piston 44 in the low pressure reservoirs 40 and 41 stroke back, it is expected that the pressure in the sealed spring chamber 47 increases. However, the pressure may be released into space of the pocket 23 formed in the pot plate 20 or the leaked brake fluid outlet hole 17, thereby relaxing the air spring effect. Therefore, this invention allows the operational pressure of the low pressure reservoirs 40 and 41 to be low, thereby eliminating the chance of damaging the pressure reduction function during the brake system control.

The body 10 is mounted on a vehicle via the rubber mount 50 installed in the pot plate 20, which facilitates the layout of components and channels in the body 10 comparing with the conventional structure that employs direct installation of the rubber mount with the body.

Further, the rubber mount 50 comprises two members, i.e., the doughnut vibration isolation rubber 51 and the inner bolt 52. Therefore, this invention remarkably reduces the number of required components comparing with the conventional rubber mount and also provides simpler assembly because of the annular groove 54 formed around the periphery of the vibration isolation rubber 51 fitting with the installation hole 26 of the bracket 22.

The pot plate 20 completely closes and seals the openings of the cylinder bores 43, which completely prevents foreign materials such as water and dusts from entering into the low pressure reservoirs 40 and 41.

In FIG. 2, a slight amount of the brake fluid leaks in the plunger pump cam chamber 13 due to the operation of the pumps 14 and 15. The leaked brake fluid naturally falls through the leaked brake fluid outlet hole 17 connected to the plunger pump cam chamber 13.

The pot plate 20 completely closing the openings of the cylinder bores 43 prevents the entry of the foreign materials such as water and dust into the low pressure reservoirs 40 and 41. The pocket 23 formed between the bottom surface of the body 10 and the pot plate 20 receives and reserves the leaked brake fluid discharged from the opening end of the brake fluid outlet hole 17 to outside of the body 10.

Embodiment 2 of this Invention

Figure 4:
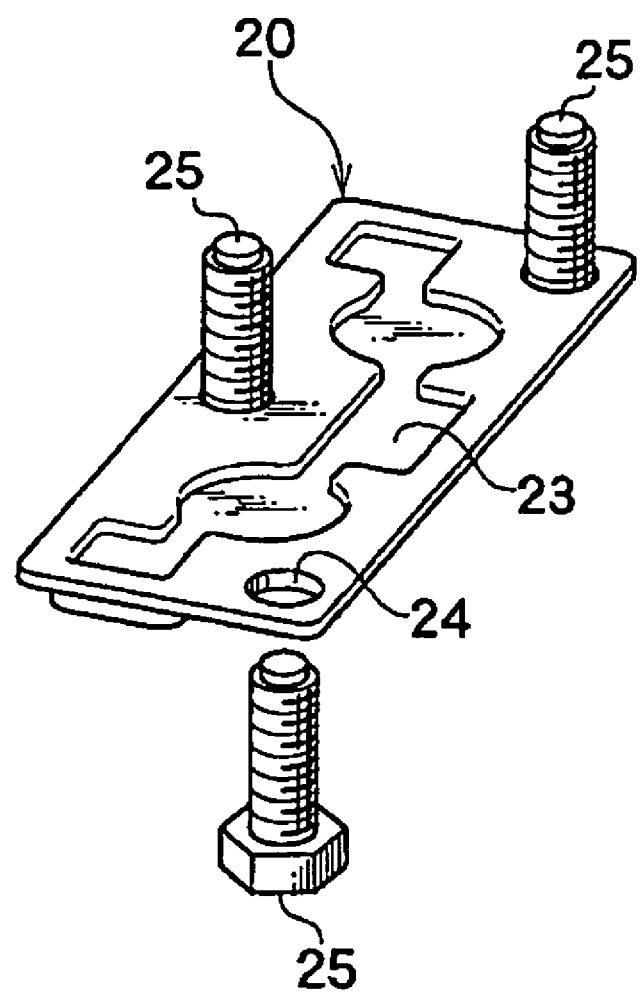
FIG. 4 is a perspective view of the pot plate according to Embodiment 2 of this invention.
Figure 5:
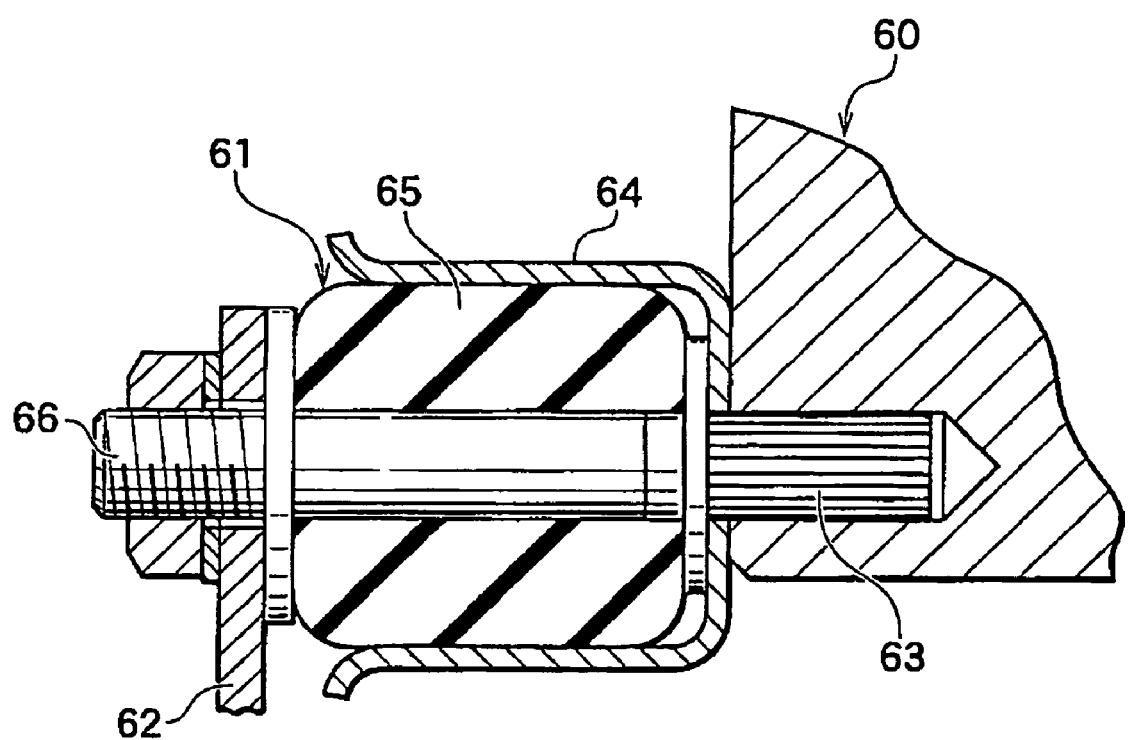
FIG. 5 is a view illustrating the conventional technology where the rubber mount is installed directly in the actuator body.
Figure 6:
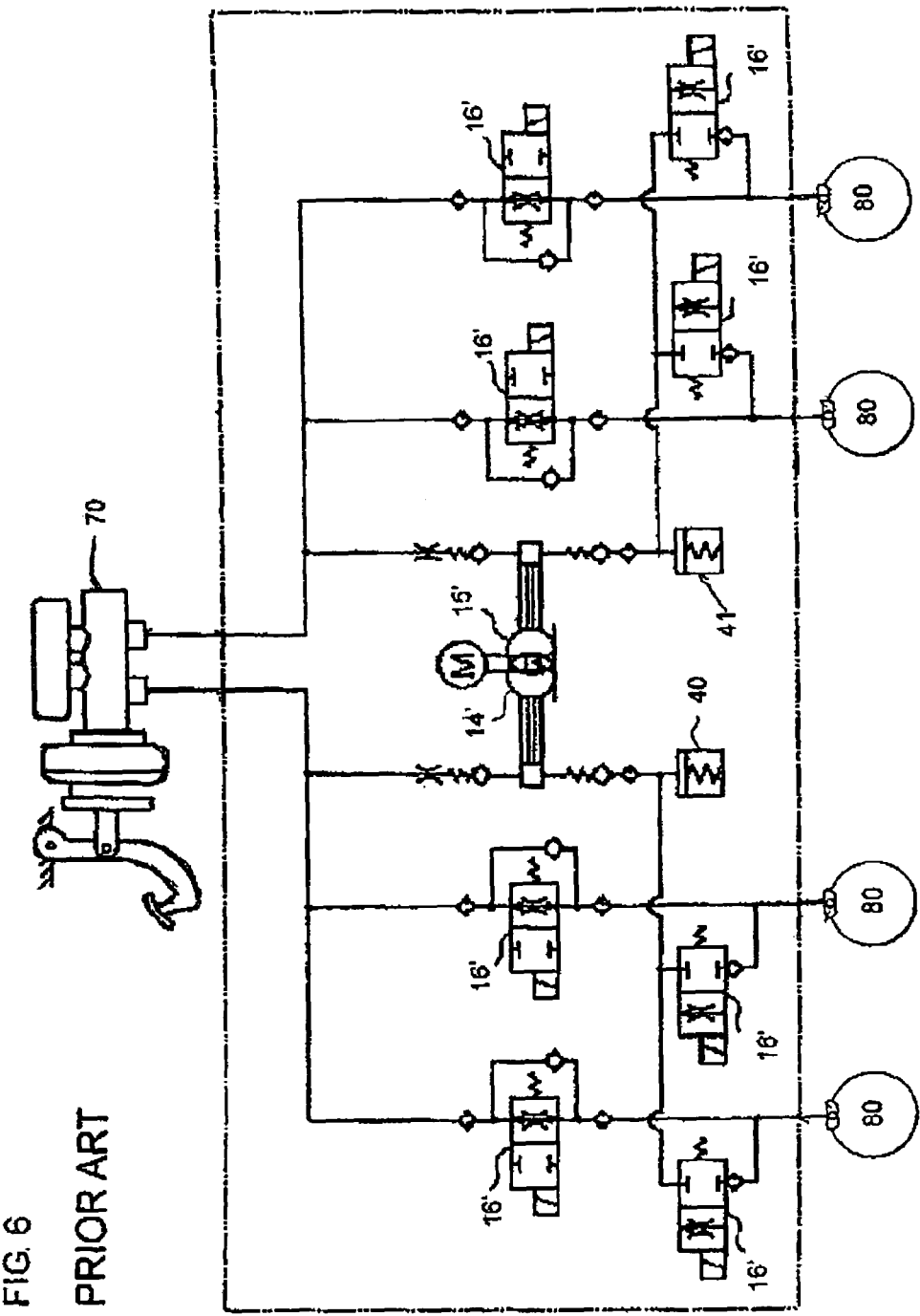
FIG. 6 is a view showing a conventional hydraulic circuit which is applicable to the present invention.

FIG. 4 shows another embodiment that does not employ the above mentioned bracket 22. Hence, the pot plate 20 with the pocket 23 may be used to close the bottom surface of the body 10 (not shown in FIG. 4) without forming the bracket 22.

This simple brake system facilitates the layout of the functional components and channel which are installed in the body 10.

If the rubber mount can directly be installed in the side surface of the body without adversely affecting the structural layout in the body, the pot plate 20 functions as a lid of the low pressure reservoirs 40 and 41, thereby preventing the entry of the foreign materials and allowing to reserve the sufficient amount of the leaked brake fluid in the pocket 23.

The brake hydraulic control actuator of this invention is structured as above and has the following advantages.

<A> This invention prevents the entry of the foreign materials into the cylinder bore and also allows to reserve the sufficient amount of the leaked brake fluid by closing and sealing the cylinder bore of the low pressure reservoirs by the pot plate with the pocket <B> This invention does not require the rubber mount to be installed directly in the actuator body because the actuator body is mounted on a vehicle while the rubber mount is being installed in the pot plate, thereby increasing the degree of freedom for structural layout in the actuator body.

<C> The rubber mount in this invention can be installed simply by fitting in the pot plate, which reduces the number of required parts comparing with a rubber mount, which is mounted directly on the body, described by the conventional technology.

It is readily apparent that the above-described invention has the advantages of wide commercial utility. It may be understood that the specific form of the invention hereinabove described is intended to be representative only, and certain modifications within the scope of those teachings will be apparent to those skilled in the art without departing from the sprit and scope of the invention.

Accordingly, reference should be made to the following claims in determining the full scope of the invention.

What is claimed is:

1. A brake hydraulic control actuator for a vehicle comprising:

an actuator body which has a solenoid valve installed in a hydraulic channel between a brake master cylinder and a wheel brake so as to control brake fluid flowing in and out said wheel brake, low pressure reservoirs which reserve the brake fluid flown from the wheel brake through said solenoid valve, a pump which returns the brake fluid within the pressure reservoirs to said hydraulic channel, and a motor which drives said pump;

a brake fluid leakage outlet hole formed between an pump interior and a bottom surface of an actuator body;

a pot plate which closes said bottom surface of the actuator body having cylinder bores for the low pressure reservoirs; and a pocket formed on said pot plate projecting toward a direction to be apart from the bottom surface of the actuator body.

2. The brake hydraulic control actuator for a vehicle according to claim 1, wherein:

said pot plate has plural brackets therearound, and said brackets have rubber mounts.

3. The brake hydraulic control actuator for a vehicle according to claim 2, wherein:

said rubber mounts comprises a doughnut rubber and an inner bolt installed in a central region of a vibration isolation rubber.

* * * * *

UNITED STATES PATENT AND TRADEMARK OFFICE
CERTIFICATE OF CORRECTION

PATENT NO. : 7,004,552 B2  Page 1 of 1
APPLICATION NO. : 10/847178
DATED : February 28, 2006
INVENTOR(S) : Hiroshi Takumori and Makoto Hyodo It is certified that error appears in the above-identified patent and that said Letters Patent is hereby corrected as shown below:

The issued patent incorrectly lists "Continental Teves AG & Co." as the assignee. The assignee name is changed to --Continental Teves AG & Co. oHG--.

Signed and Sealed this

Fifth Day of December, 2006

JON W. DUDAS
*Director of the United States Patent and Trademark Office*